2,887,721
METHOD AND MEANS FOR PRODUCING REINFORCED PLASTIC STRUCTURES

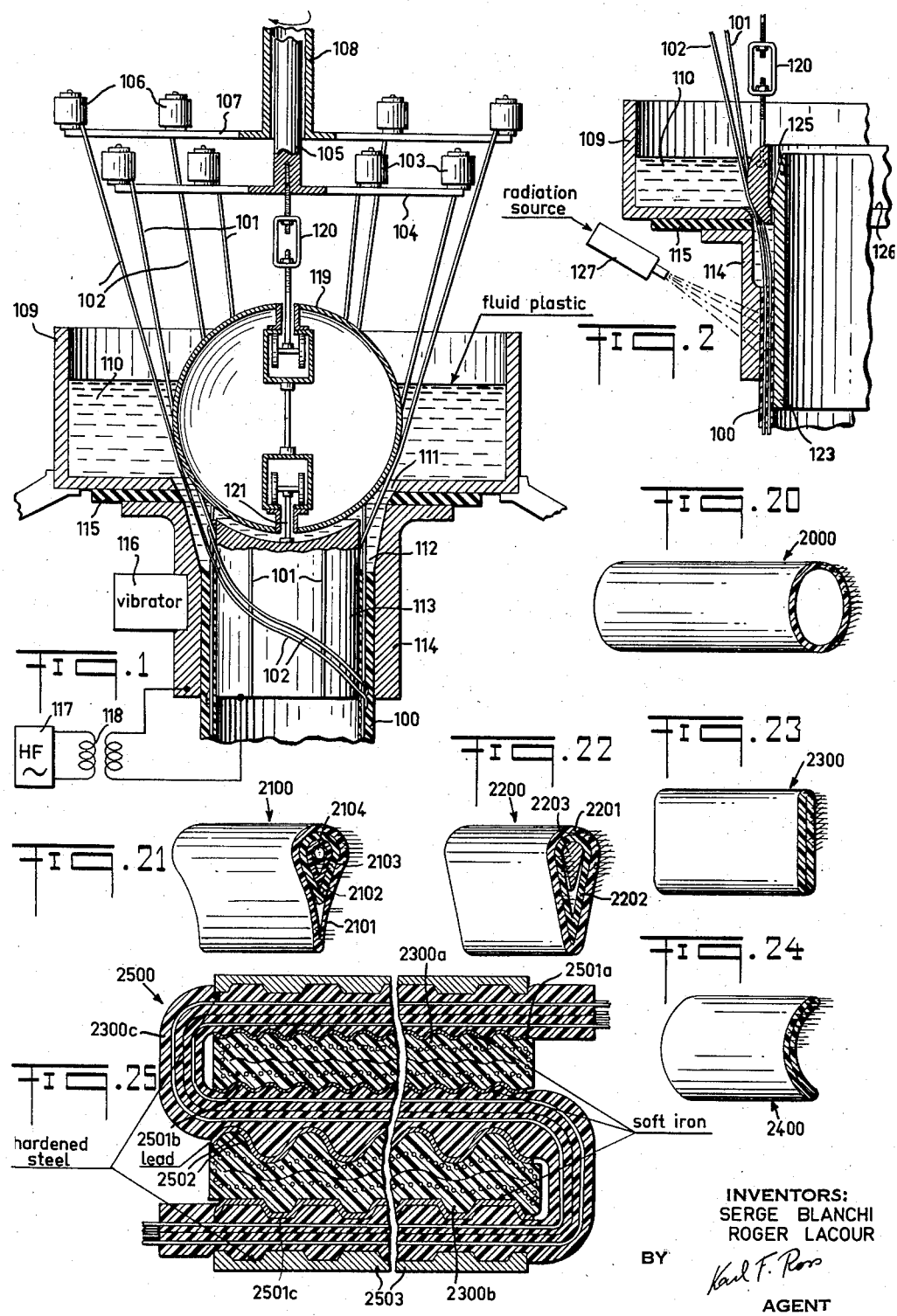

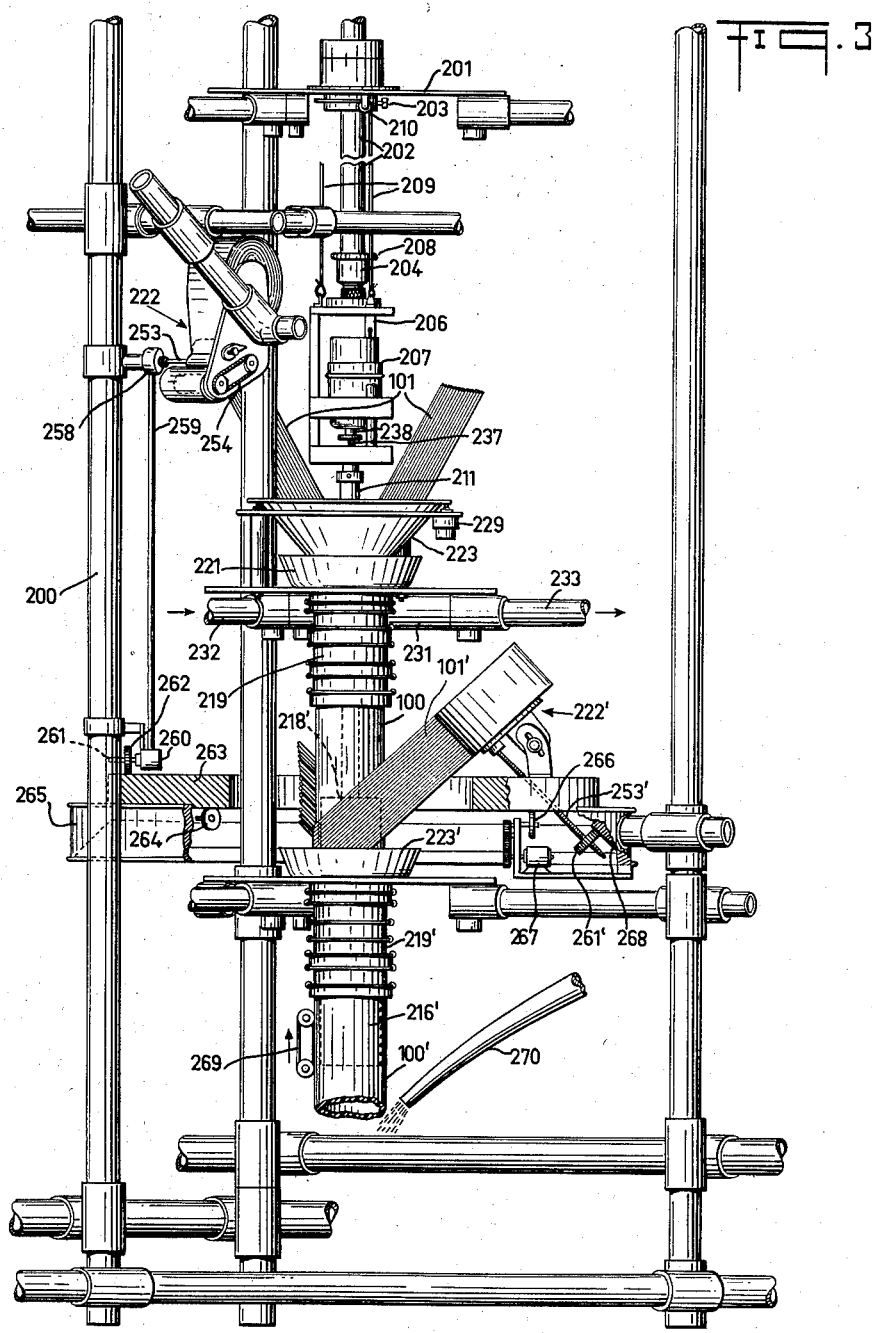

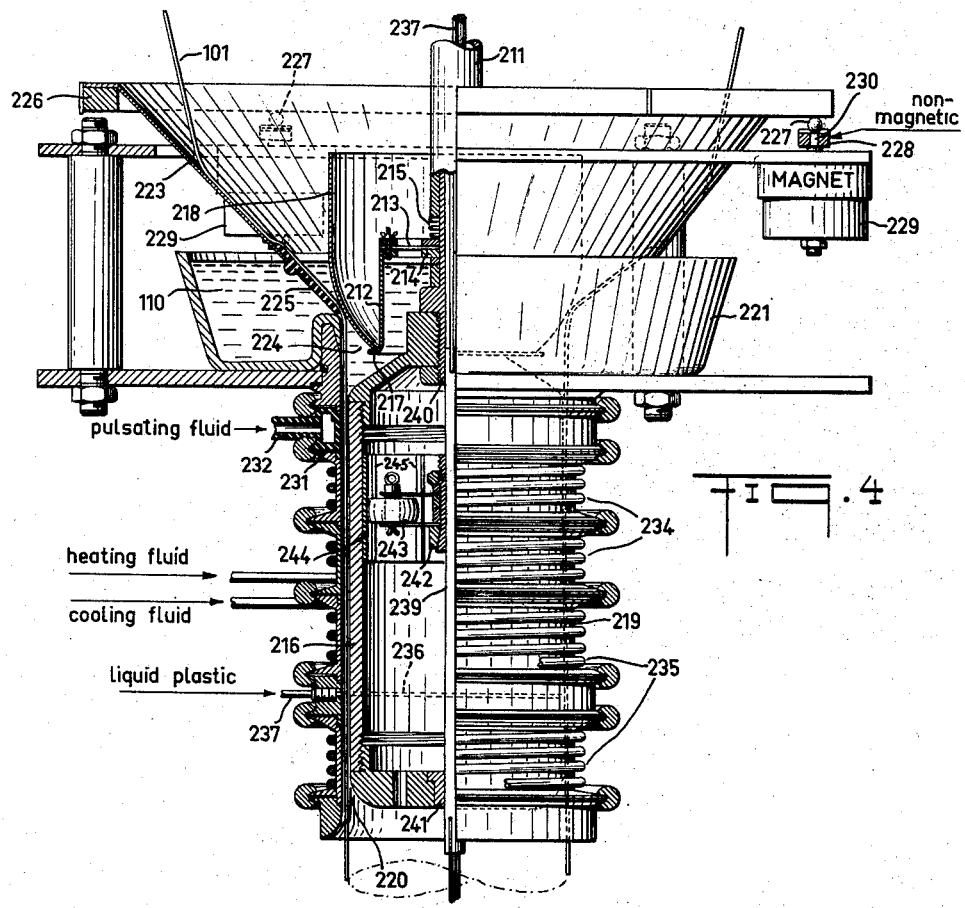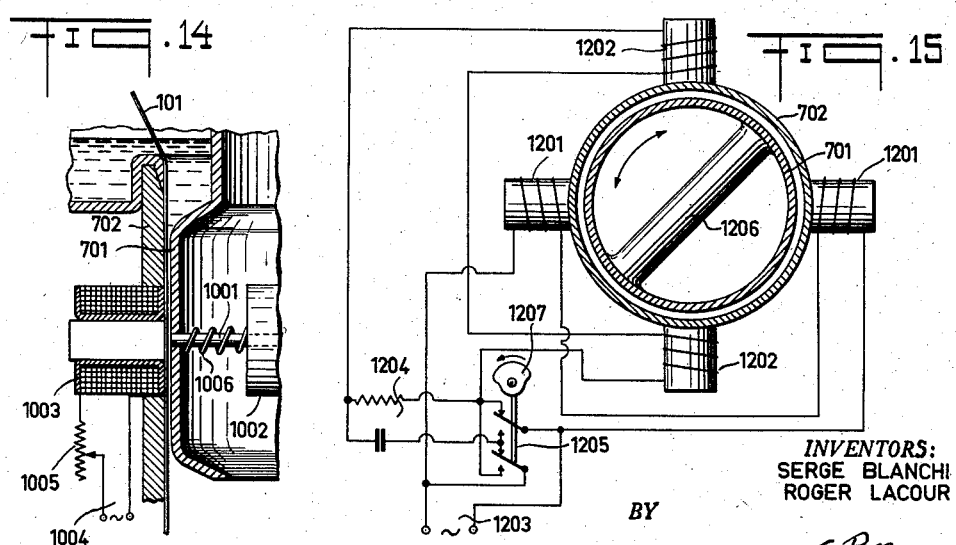

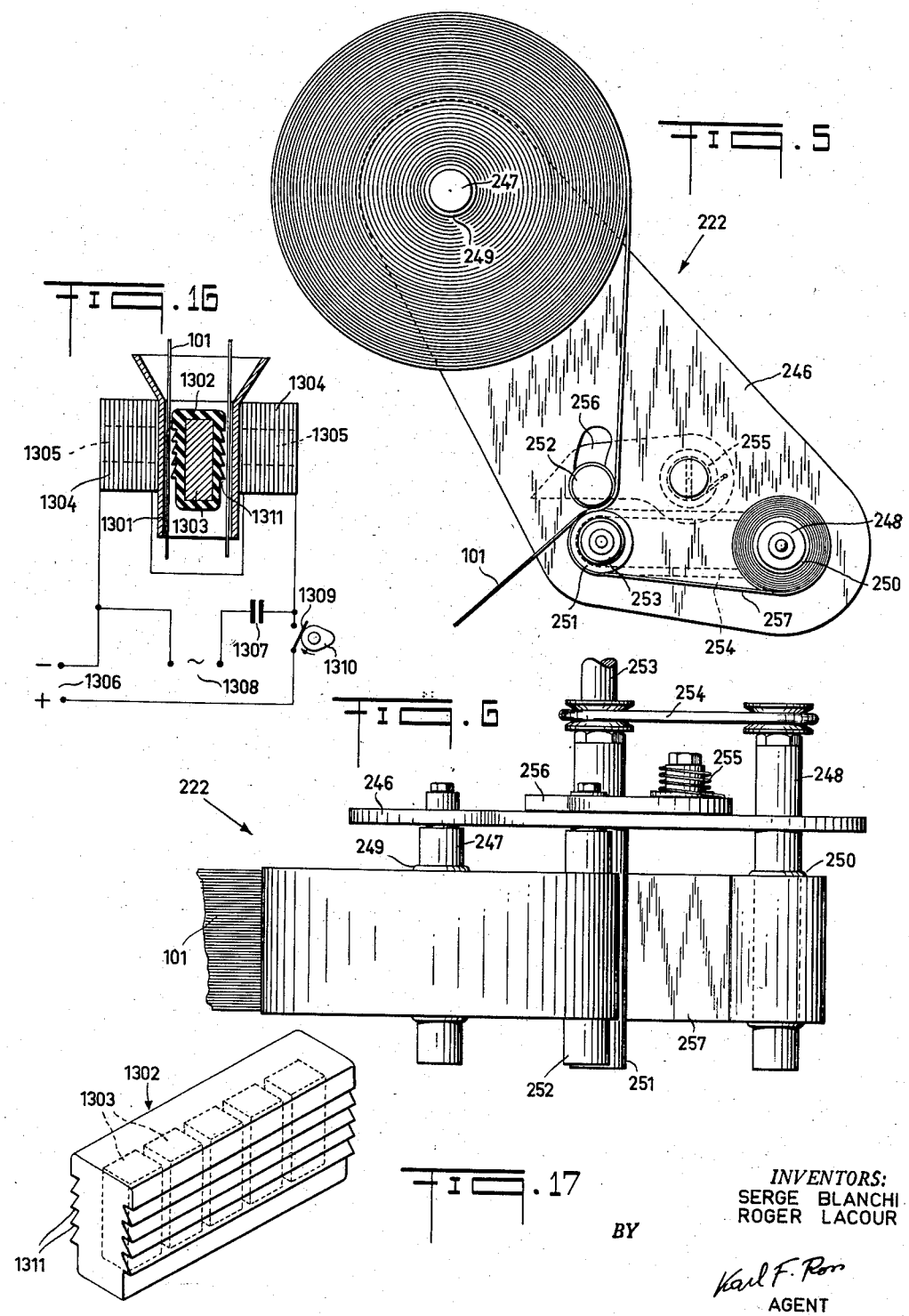

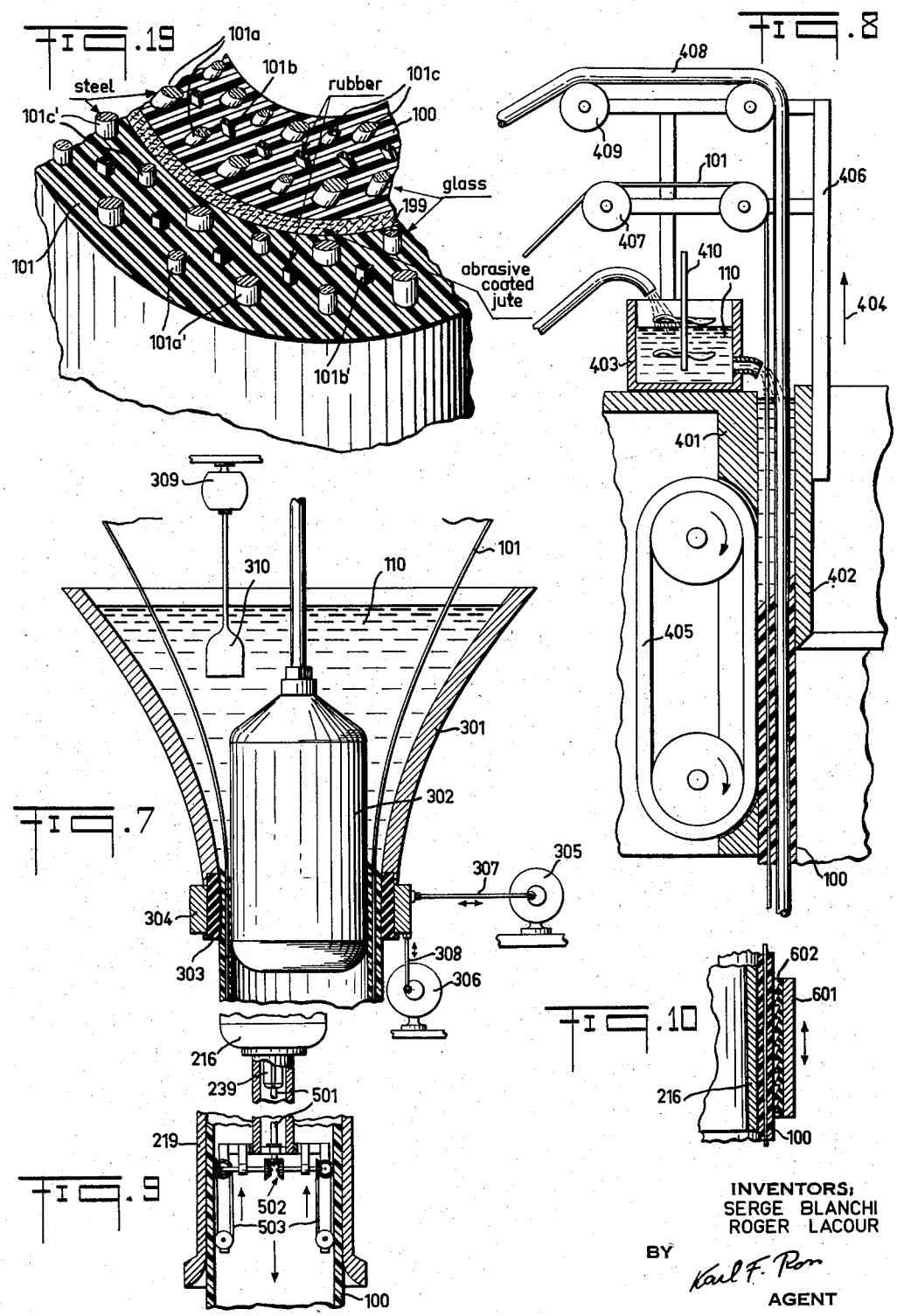

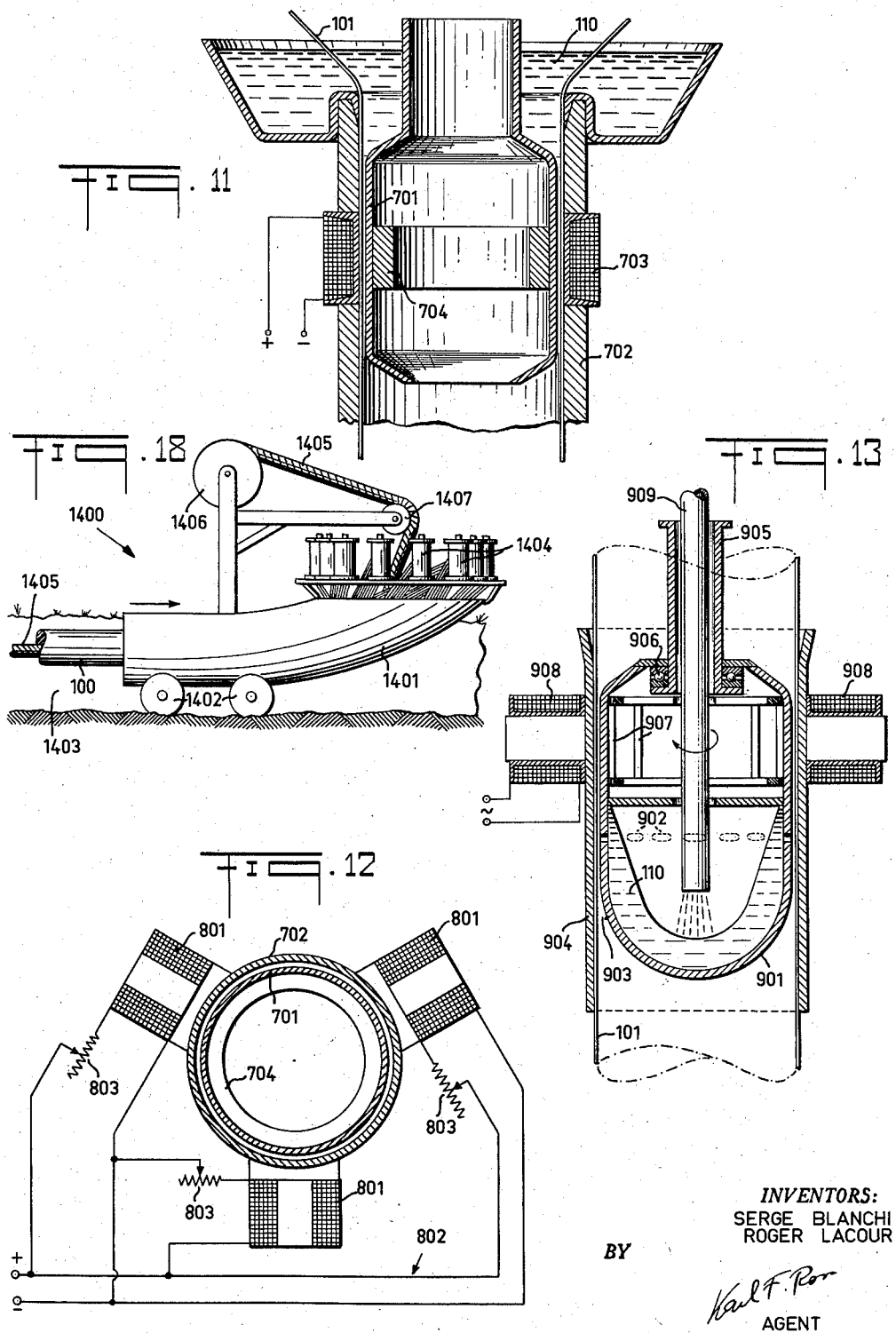

Serge Blanchi, Le Vesinet, and Roger Lacour, Paris, France

Application May 8, 1956, Serial No. 583,515

Claims priority, application France May 10, 1955

6 Claims. (Cl. 18—14)

Our present invention relates to a method of making reinforced plastic structures, i.e. structures of thermosetting or thermoplastic resinous materials having increased tensile strength by having fibers, wires or other filamentary matter imbedded therein, as well as to plastic bodies so produced and to apparatus for implementing the method.

It has already been proposed to reinforce a plastic body by imbedding therein a system of interlaced, matted, webbed or otherwise intersecting threads, yarns or the like; it has been found, however, that such bodies exhibit marked structural weaknesses at the cross-over points of the threads offsetting, at least in part, the increase in tensile strength obtained by the presence of the reinforcement. Moreover, the doubling of the thickness of the strands at their points of intersection limits their diameter to a small fraction of the thickness of the plastic layer in which they are to be imbedded.

It is an object of the present invention to provide a plastic structure in which, through the use of elongated, flexible reinforcements, a high tensile strength in a preferred dimension is obtained and objectionable weaknesses as mentioned above are substantially eliminated.

It is another object of this invention to provide a method of expeditiously imbedding reinforcements of the aforesaid character in an elongated plastic body, during manufacture of the latter, in such manner as to enable continuous production of sections of unlimited length of such body.

It is also an object of our invention to provide apparatus for carrying out the method just referred to in a simple, efficient and economical manner.

Fundamentally, our invention involves the provision of a tubular array of flexible, elongated reinforcing elements of high tensile strength, such as yarns, asbestos filaments, horse hair, glass fibers, wires, rubber tubing and so forth, around which there is molded a tubular body of plastic material in such manner that the reinforcing elements are completely imbedded in the plastic; the reinforcing elements are non-overlapping and substantially parallel to one another, extending either parallel to the principal dimension of the plastic body or helically, with a long lay, around its axis. The tubular array and body need not be of circular cross section but may be of elliptical, polygonal or any other closed configuration; moreover, according to another feature of the invention, the finished tubular plastic body may be flattened or otherwise deformed to assume the shape of a board, beam or other element of construction.

Any moldable resinous material, whether thermoplastic or thermosetting, can be used for purposes of the present invention. By way of example we may mention natural and synthetic elastomers, vinyl polymers, polyester and epoxy resins, phenol formaldehyde and melamine compounds, as well as the polyamides, polyacrylates and polystyrenes. A fluid form of such mass is introduced into a narrow annular channel traversed by the array of reinforcing elements and is allowed to harden within that channel, this process being preferably accelerated or controlled with the aid of suitable conditioning means, such as heating and/or cooling devices, according to the nature of the plastic material. As the reinforcing elements are progressively payed out from suitable bobbins or the like, the fluid plastic is continuously supplied to one end of the channel while from the other end thereof the finished tubular body is continuously extracted; such extraction may be effected by gravity and/or with the aid of a special feed mechanism. Desirably, the channel is defined at least in part by elastic members and is subjected to some vibratory force to insure uniform distribution of the resinous material around the reinforcing array; these members include a mandrel surrounded by a sheath, the mandrel being preferably tapered at its exit end to accommodate the contracting resinous body (especially in the case of thermosetting materials) and to facilitate its withdrawal from the channel.

Still another feature of the invention resides in the provision of magnetic means for yieldably maintaining the channel-forming members in a desired relative position and/or imparting vibratory or rotating motion thereto.

The above and further features, objects and advantages of our invention will become more fully apparent from the following detailed description, reference being had to the accompanying drawing in which:

Fig. 1 is a partly diagrammatic view of the principal elements of an apparatus embodying the invention;

Fig. 2 is a fragmentary view similar to Fig. 1, showing a modification;

Fig. 3 is an overall elevational view of a multistage apparatus representing another embodiment;

Fig. 4 is an enlarged view, partly in section, of the upper stage of the apparatus of Fig. 3;

Figs. 5 and 6 are enlarged top and side views, respectively, of one of the bobbins utilized in the arrangement of Figs. 3 and 4;

Fig. 7 is an elevational view of another modification of the entrance end of a molding channel in an apparatus according to the invention;

Fig. 8 shows one form of feed mechanism for use with an apparatus according to the invention;

Fig. 9 is an elevational view of the exit end of a molding channel, illustrating another type of feed mechanism;

Fig. 10 is a fragmentary view similar to Fig. 9 but showing still another form of feed mechanism;

Fig. 11 is an elevational view of a molding channel provided with electromagnetic centering means;

Fig. 12 is a transverse sectional view of a molding channel provided with different electromagnetic centering means;

Figs. 13 and 14 are views similar to Fig. 11, showing additional modifications;

Fig. 15 is a view similar to Fig. 12 yet showing another modification;

Fig. 16 illustrates, in elevation similar to Fig. 11, a feeding and vibrating mechanism operated by electromagnetic means;

Fig. 17 is a perspective view of a core assembly used in the arrangement of Fig. 16;

Fig. 18 is a side-elevational view of a mobile unit embodying the invention and adapted to produce a horizontal cable sheath or pipe;

Fig. 19 is a perspective view of a transverse section of multi-layer plastic body according to the invention;

Figs. 20–24 illustrate, in perspective, body sections of various shapes obtainable by the present invention; and Fig. 25 is a sectional view of a composite armor plate formed from plastic bodies according to the invention.

In Fig. 1 there is shown an apparatus according to the invention, adapted to produce a tube 100 of plastic material having imbedded therein a first layer of filaments 101 and a second layer of filaments 102. The filaments 101 of the first or inner layer extend parallel to one another in an axial direction of tube 100, i.e. vertically in this embodiment, whereas the filaments 102 of the second or outer layer are disposed helically and with a long lay so that they, too, extend generally in axial direction of the tube while also imparting some tensile strength thereto in a peripheral direction. A set of bobbins 103, mounted on a stationary rack 104 supported by an arbor 105, serve as sources of supply for the inner filaments 101; similarly, a set of bobbins 106 act as dispensers for the outer filaments 102, the latter bobbins being mounted on a rack 107 rotatably supported by a tubular shaft 108 surrounding the arbor 105. The racks 104 and 107 are spider-shaped and have each a number of radial arms supporting the associated bobbins which are disposed in a circular array.

A reservoir 109 contains a liquid or pasty plastic mass 110 from which the body of tube 100 is to be formed. The bottom of the reservoir is formed with an aperture 111 through which the mass 100 can flow into a narrow annular channel 112 defined by a mandrel 113 concentrically surrounded by a sheath 114. The latter is resiliently suspended from reservoir 109 through the intermediary of rubber disk 115 so as to be able to oscillate, relatively to mandrel 113, under the control of a vibrator 116; suitable vibrators for this purpose will be described in detail with reference to succeeding figures. A source 117 of high-frequency voltage is connected through a transformer 118 across the mandrel 113 and the sheath 114, thereby setting up a high-frequency field in the lower reaches of channel 112 which serves for the curing, by dielectric heating, of the mass 110 assumed to be an unpolymerized form of a thermosetting resin.

The effective cross section of aperture 111 is controlled by a plug 119 suspended from arbor 105 by an adjustable link 120. Plug 119 is shown to be in the form of a sphere and provided with a depending link 121 serving for the suspension of mandrel 113, the latter thus also serving as a weight designed to maintain the plug submerged within the mass 110. Adjustment of link 120 enables variations in the size of the entrance to channel 112.

In operation, the filaments 101, 102 pass around the plug 119 and through aperture 111 into channel 112 where they form two distinct tubular arrays of non-intersecting, substantially parallel threads imbedded within the hardening plastic mass 110. By controlling the speed of rotation of the bobbins 106, 107 around their spindles, e.g. by an arrangement as described hereinafter with reference to Fig. 3, or by other suitable feed mechanism the rate of descent of the finished tube 100 within channel 112 can be adjusted to correspond to the rate of curing of the plastic mass 110, the speed of rotation of movable rack 107 being co-ordinated with this movement so as to impart the desired pitch to the helically wound threads 102.

It will be noted that the channel 112, which is flared out in its upper portion, has its entrance at aperture 111 constricted by the plug 119 to an area whose width, depending upon the position of the plug, determines the rate of fluid entry into the channel. The mobility of the plug 119 avoids any danger of a pinching of the threads even when this aperture is greatly reduced. Air bubbles entrapped by the plastic mass in channel 112 are driven to the surface by the action of vibrator 116 which also insures uniform and thorough coating and/or impregnation of the filaments.

Although only a comparatively small number of threads 101, 102 have been shown in Fig. 1, it will be understood that their number may be increased at will and that the threads of each array may in fact be contiguous, or nearly so, as will be apparent from subsequent figures.

In Fig. 2 we have shown an arrangement generally similar to that of Fig. 1 but with a plug 122 and a mandrel 123 of annular configuration, thereby forming a central bore 124 which can be traversed by a second, similar tube, by a core member, by a cable or by any other elongated structure designed to be surrounded by the tube 100. Mandrel 123 has a shoulder 125 which rests on a ledge 126 of plug 122, the latter being suspended from the frame of the machine (not shown) by means of several links 120 (only one illustrated). Other elements, analogous to those of the preceding embodiment, have been designated by the same reference numerals as in Fig. 1.

In Fig. 2 the two sets of threads 101, 102 have both been shown extending in an axial direction, this arrangement being obtained by holding the rack 107 stationary. Also, this figure illustrates by way of example another arrangement for expediting the curing of the mass 110, comprising one or more sources of radiation (e.g. gamma rays) as indicated at 127.

Reference is now made to Figs. 3-6 which show a modified apparatus according to our invention wherein several filamentary layers or arrays are formed in successive stages, rather than simultaneously as in Figs. 1 and 2, so as to be separated from one another by finite layers of plastic. The machine of Fig. 3 comprises a frame 200 including a platform 201 from which a rod 202 is suspended; a screw 203 permits some horizontal adjustment of the position of the rod. The lower end of rod 202 is threadedly engaged by a sleeve 204 from which depends, through the intermediary of an elastic link 205, a cage 206 supporting a motor 207; vertical adjustment of the position of motor 207 is possible by rotation of the milled flange 208 of threaded sleeve 204. Wires 209 extend upwardly, over idler rollers 210, from cage 206 to permit a slight manual raising thereof relative to frame 200.

A tubular stem 211 depends from cage 206 and, as seen in Fig. 4, resiliently supports a cylinder 212 by means of radially extending spring fingers 213 (only one shown) whose hub 214 is under pressure from a coil spring 215. A hollow mandrel 216 is rigidly secured to the lower end of stem 211. Cylinder 212 has an outwardly extending flange 217 at its lower end upon which rests a plug 218 shaped like a bottomless cup. An outer sheath 219, composed of several sections to facilitate assembly of the apparatus, concentrically surrounds the plug 218 and defines with it an annular channel 220 designed to receive the plastic mass 110 from a reservoir 221.

Filaments 101 are supplied from a circular array of dispensers of which one has been indicated at 222 and shown in greater detail in Figs. 5 and 6. Unlike the arrangement of Figs. 1 and 2, the apparatus of Fig. 3 is adapted to form a sheath of contiguous threads within a tube 100 with the aid of only a small number of dispensers, e.g. four, each adapted to supply a sheet of filaments 101 running close to one another in a planar array. These sheets of filaments are merged within a funnel 223 leading into the bottom aperture 224 of reservoir 221. The small end of funnel 223 is formed of rubber or the like to constitute a resilient apron 225 yieldably embracing the curved lower portion of plug 218. It will be noted that the center of hub 214 substantially coincides with the center of curvature of this lower plug portion so that oscillations of plug 218 around this center, caused by deflections of its supporting springs 213, will not materially impair the fit between the members 218 and 225 between which the filaments 101 pass under gentle pressure.

The upper end of funnel 223 is formed by a flange 226 resting by its own weight on a series of steel balls 227 each attracted toward the center of a non-magnetic plate 228 by a respective magnet 229 whose core 230 terminates flush with the upper surface of that plate. This arrangement enables almost frictionless radial displacement of the funnel 223 in any direction, the balls 227 rolling more or less freely on their support within a radial groove provided therefor, which groove may however be omitted.

An upper section 231 of sheath 219 is formed of resilient material and constitutes a duct for the circulation of a pulsating fluid, the latter entering at 232 and leaving at 233 (Fig. 3). The next-lower sections of the sheath are surrounded by a coil 234 wherein circulates a heating fluid from a suitable source not shown; the lowermost sheath sections are enclosed within a coil 235 adapted to carry a cooling fluid. Sheath 219 is provided near its bottom with an internal peripheral groove 236 communicating with an inlet tube 337 for the admission of fresh liquid plastic into channel 220.

A link 237, such as a flat bar, traverses the stem 211 and positively couples the shaft 238 of motor 207 with a shaft 239 journaled in bearings 240, 241 within mandrel 216. Shaft 239 carries an assembly 242 with several pairs of radially extending arms rotatably supporting a corresponding number of rollers 243 (only one shown). The assembly 242 is surrounded by a ring 244, which may be of spring steel, press-fitted inside mandrel 216 and provided with surface irregularities, such as one or more vertical grooves 245, positioned in the path of rollers 243. The rhythmic impingement of the rollers 243 upon these surface irregularities, when motor 207 is in operation, causes both radial and tangential vibrations of the mandrel whose frequency depends upon the number of rollers and grooves as well as upon the motor speed.

Reference is now made particularly to Figs. 5 and 6 for a description of the dispensers 222. Each dispenser comprises a base plate 246 carrying spindles 247 and 248 adapted to receive a supply roll 249 and a take-up roll 250, respectively, a feed roller 251 and a pressure roller 252. The shaft 253 of feed roller 251 is coupled with the take-up spindle 250 via a belt 254 having sufficient slippage to compensate for the change in relative speed as the effective diameter of roll 250 is varied. A spring 255 acts upon a pivoted arm 256, which supports the pressure roller 252, in a sense urging this roller into contact with feed roller 251.

The supply roll 249 is initially loaded with the sheet of filaments 101 backed by a paper strip 257, the two layers being held together, if desired, by a weak adhesive so as to be readily separated after passing between rollers 251 and 252. The paper strip 257 thereupon passes toward take-up roll 250 upon which it is progressively wound, the filaments 101 proceeding toward the funnel 223 as shown in Figs. 3 and 4. Drive shaft 253 is connected via a coupling 258 with a vertical shaft 259 and thence, through another coupling 260, with a horizontal shaft 261 carrying an axially adjustable friction wheel 262. A turntable 263, resting on idler rollers 264 (only one shown) within a stationary mounting ring 265, is in frictional engagement with wheel 262 so that the latter will be rotated, at a speed depending upon its radial position relative to turntable 263, when motion is imparted to the turntable by a driving roller 266 operated by a motor 267.

It will be understood that each of the remaining dispensers, now shown, is driven from turntable 263 over a transmission system similar to the one just described.

The turntable 263 also carries a second set of dispensers 222' (only one shown) which are identical with the dispensers 222 but inclined at an angle of 45° and whose filaments 101' are to be imbedded in an outer plastic layer to be molded around the tube 100 previously formed. Drive shaft 253' of dispenser 222' carries an axially adjustable friction wheel 261' which rides on an internal ramp 268 of mounting ring 265. As the turntable 263 rotates, motion is imparted to shaft 253' at a speed depending on the position of wheel 261' on this shaft.

The filaments 101' from the several dispensers 222' enter a second stage which comprises a reservoir 221', a sheath 219', a mandrel 216' and a plug 218' and which is in every respect similar to the preceding stage, except that a funnel corresponding to element 223 has been omitted; such funnel may, of course, be provided if desired. Also shown diagrammatically are various feed means for the forced extraction of the finished article from the apparatus, such as a rough-surfaced belt 269 which frictionally engages the outer surface of tube 100' emerging from the second stage and, in conjunction with other such belts (not shown) in different angular positions, serves to drag this tube out of sheath 219'; and a nozzle 270, again representing an array of such elements, adapted to produce a stream of fluid (gas, liquid, jet of solid particles) imparting an axial velocity component to the tube 100' and serving, if desired, also as a lubricant to facilitate the subsequent introduction of the tube into a pipe, guide channel or other object designed to receive it.

The mode of operation of the apparatus of Fig. 3 will be apparent from the foregoing description, except that it should be pointed out that the filaments 101 undergo a first coating or impregnation within funnel 223, followed by a partial drying and removal of excess liquid as they pass through the wringer constituted by apron 225 and plug 218, whereupon a second coating or impregnation occurs within reservoir 110. In the second stage this preliminary treatment and drying is accomplished by the introduction of fluid plastic at 237, hence the omission of a funnel at that stage. The pulsations generated in duct 231 drive out entrained air bubbles from the hardening mass while uniform distribution is insured by the vibrator 243. The temperature of the heating and cooling fluids in coils 234 and 235 is controlled to provide a desired rate of hardening for the thermoplastic or thermosetting mass 110.

The wires 209 are convenient means for raising the cage 206 and, with it, cylinder 212 and plug 218 to facilitate the insertion of filaments 101 between the latter and apron 225 at the beginning of operations or when any of the dispensers 222 has been exhausted.

Mandrel 216', acting as a guide for tube 100, may also be omitted in which case the latter tube will serve as a mandrel for the second stage.

In Fig. 7 we have shown a modification wherein the mass 110 and the threads 101 pass between a sheath 301 and a mandrel 302, the lower end of the sheath terminating in a resilient sleeve 303 clamped in a movable ring 304 and positioned at the narrowest point of the molding channel. A pair of motors 305, 306 drive two pitmans 307, 308 adapted to impart horizontal and vertical oscillations, respectively, to the sleeve 303 for the purpose previously set forth. A third motor 309 drives a stirrer 310 for agitating the mass 110. In this embodiment the members 301, 302 may both be rigid with the frame of the machine (not shown), in contradistinction to the mobile plunger-type mandrels shown in Figs. 2 and 4.

Fig. 8 illustrates an arrangement wherein the molding apparatus is a mobile unit comprising a sheath 401, a mandrel 402 and dispensers (not shown) for filaments 101 as well as a reservoir 403 for the mass 110, all displaceable in a vertical direction as indicated by the arrow 404; this displacement is brought about by a set of belts 405 (only one shown) which are similar to belt 269 in Fig. 3 and frictionally engage the finished, hardened portion of the emerging tube 100. The speed of the driving mechanism, not further illustrated, for the belts 405 is so selected that the frame 406 of the unit rises along the tube 100 at the rate at which the latter is growing by the continuous solidification of part of the mass 110 within the channel defined by sheath 401 and mandrel 402. Thus, the arrangement of Fig. 8 enables the erection, without falsework or scaffolding, of columns or the like which are anchored to the ground from their inception and can be built up in situ to any desired height. It may be mentioned that these columns need not be perfectly upright but may be inclined or arched as required, a curving of the tube 100 being possible, for instance, by imparting slightly different speeds to oppositely positioned belts 405.

In addition to the threads 101, which pass over idler rollers 407 on frame 406, Fig. 8 also illustrates the provision of a second layer of reinforcing elements in the form of an array of rods or tubes 408 of rubber or the like, passing over other idler roller 409. It will be noted that the elements 408 (only one shown) are of much larger diameter than the threads 101, in contradistinction to the arrangement of Figs. 1 and 2 where both sets of filaments 101, 102 were of the same thickness. An agitator for the mass 110 is shown at 410.

Fig. 9 illustrates still other means for expediting the extraction of a tube 100 from a molding apparatus as herein disclosed, this apparatus being for the rest similar to that of Figs. 3 and 4 and comprising a mandrel 216, a sheath 219 and a shaft 239 rotatable within the mandrel. An extension shaft 501 couples shaft 239 with a gear transmission 502 which drives a pair of oppositely positioned belts 503 generally similar to the belts 269 and 405 previously described. The direction of movement of the belts 503 is again such as to remove the tube 100 downwardly from the sheath 219; the latter may belong to the same stage as mandrel 216 or to a subsequent stage.

It will be understood that the advance of tube 100 may also be accomplished by having the belts 503, acting upon the inner tube wall, co-operate with belts bearing upon the tube from without, such as the belts 405 or 269, instead of providing a stationary backing such as sheath 219 for the frictionally entrained tube.

Fig. 10 shows a further form of feed means comprising an outer ring 601 which takes the place of belt 269 in Fig. 3. Ring 601 is provided with a resilient inner layer 602 forming downwardly facing sawteeth; when the ring is reciprocated by suitable means (not shown) in a vertical direction, as indicated by the arrow, the serrations of layer 602 will entrain the tube 100' on each downstroke but slide past it on moving upwardly, thereby resulting in a net downward movement of the tube, relative to mandrel 216', in intermittent fashion. Naturally, the positions of sheath 219 and ring 601 could be interchanged and the latter inverted so that the sawteeth of its layer 602 would engage the tube 100' from within, in the manner of the belts 503 in Fig. 9, as has been illustrated in Fig. 16.

Fig. 11 shows how a mandrel 701 can be floatingly suspended and centered within a sheath 702 by an electromagnetic coil 703; the mandrel 701 is provided for this purpose with a ferrous, preferably annular core piece 704 which is strongly attracted by the coil 703 and yieldably retains the mandrel in position.

A similar arrangement, shown in Fig. 12, differs from the one just described in that the coil 703 has been replaced by a plurality of coils 801 arranged in a polygonal array, such as a triangle, around the sheath 702. Each coil 801 is energized from a power source 802 by way of a respective rheostat 803 enabling individual adjustment of the strength of its magnetic field. By this means it is possible to set up an eccentric field so as to overcome unidirectional gravitational pull if the mandrel is to be maintained in a position other than vertical, as when an inclined or horizontal tube is to be produced.

In Fig. 13 we have illustrated a modified mandrel 901 whose lower part constitutes a reservoir for the mass 110 and is provided with a series of windows 902 through which this mass may be centrifugally ejected into channel 903, surrounded by sheath 904, when the mandrel is placed in rapid rotation. For this purpose the mandrel 901 is rotatably supported on a tubular stem 905 by means of ball bearings 906 and is internally fitted with a squirrel-cage-type rotor 907 positioned within a rotating magnetic field produced, in a manner more fully illustrated in Fig. 15, by coils 908. The mass 110 is introduced into the mandrel by a pipe 909 passing concentrically within stem 905. Fig. 13 shows the concave meniscus formed by this mass during rotation of mandrel 901, the level of the mass being above that of apertures 902 under these conditions.

Fig. 14 shows an arrangement generally similar to that of Fig. 11 except that the mandrel 701 is provided with an inwardly projecting pin 1001 upon which a weight 1002 of ferromagnetic material is slidable. A coil 1003, energized from a source 1004 of alternating current by way of a rheostat 1005, and a compression spring 1006 act upon the weight 1002 in such manner that the same executes vibratory movements in step with the oscillations of the current from source 1004. The frequency of the alternating current is preferably selected to be equal to the natural frequency of the moving system 1002, 1006 or some harmonic thereof, e.g. the second subharmonic in which case the system performs one vibratory cycle for each half-cycle of source 1004. The coil 1003 may, of course, be supplemented by a magnetic suspension system, e.g. as shown in Figs. 11 and 12, or it may be used in combination with some of the mechanical suspension means described in connection with the preceding figures.

The coils 1201 of Fig. 15 are similar to the coils 908 and, together with coils 1202 disposed at right angles thereto, are adapted to set up a rotating electromagnetic field across the combination of mandrel 701 and sheath 702. Coils 1201 are connected directly across a source 1203 of alternating current whereas coils 1202 are connected to that source through the intermediary of a 90° phase-shifting network 1204 and a reversing switch 1205. A ferromagnetic bar 1206 is wedged into mandrel 701 and tends to follow the vector of the magnetic field. The direction of rotation of this field is periodically reversed by the switch 1205 under the control of a rotating cam 1207. As a result, mandrel 701 oscillates around its axis at a rate determined by the speed of cam 1207.

It will be understood that the rotor 907 of Fig. 13 and the bar 1206 of Fig. 15 may be interchanged and that in either of these embodiments both rotary and oscillatory movement may be imparted to the mandrel in the manner described.

The arrangement of Fig. 16 is adapted for the production of a tube of substantially rectangular cross section, i.e. one which is considerably wider in one dimension than in the other. Within the correspondingly shaped sheath 1301 there is here positioned an insert 1302 in the form of an elongated prismatic block, illustrated in perspective view in Fig. 17. The block 1302 contains a series of ferromagnetic armatures 1303 positioned in the magnetic field of two coils 1304 whose cores 1305 are preferably of the same transverse dimensions as the row of armatures 1303. Coils 1304 are serially energized from a source 1306 of direct current upon which there is superimposed, through a condenser 1307, an alternating current from a source 1308. A switch 1309, in series with direct-current source 1306, is periodically opened and closed by a cam 1310.

The outer portion of insert 1302, surrounding the armatures 1303, consists of rubber or the like and is formed with sawteeth 1311 similar to those of ring 601 in Fig. 10. The successive opening and closing of switch 1309 by cam 1310 causes the unsupported insert to carry out vertical oscillatory movements as the armatures 1303 are alternately attracted by the cores 1305 and released to drop a short distance by gravity. Thus, the weight of insert 1302 is added to that of the finished tube portion to help in the extraction of the latter, the teeth 1311 being unidirectionally effective as has been described in connection with Fig. 10. Vibrations in horizontal direction are caused, at the same time, by the superimposed alternating current from source 1308 whose amplitude may be considerably less than the magnitude of the direct current and whose frequency may be much higher than that of the interrupter 1309, 1310.

Fig. 18 represents a mobile unit 1400 for producing a tube 100 of considerable length designed to be disposed substantially horizontally in or above the ground, as in the case of a pipe line or a cable sheath. The unit 1400 comprises a carriage 1401 resting on wheels 1402, motor-driven or not, by which it can be displaced within a ditch 1403 at the rate of growth of the tube 100. The filaments or reinforcements 101 are delivered from a set of bobbins 1404 and are incorporated into the tube within the carriage 1401 whose interior forms a tubular molding channel similar to those previously described and illustrated, plastic mass in a fluid state being supplied to this channel from a suitable reservoir not shown. If the tube 100 is to serve as a cable sheath, a cable 1405 may be inserted through a hollow mandrel (not shown) within carriage 1401 as has been described, for example, in connection with Fig. 2; cable 1405 is continuously supplied from a capstan 1406 and passes over an idler roller 1407 to enter the apparatus centrally of the filaments 101 coming from bobbins 1404.

A section of tube produceable by the various embodiments of our invention hereinabove described has been perspectively illustrated in Fig. 19. It comprises an inner plastic layer 100, an outer plastic layer 100' and an intervening tubular layer 199 consisting of a flexible sheet material of substantial tensile strength and rough surface to afford good anchorage to the surrounding plastic. A suitable material for the layer 199 is a sandpaper-surfaced fabric, such as a jute cloth having deposited thereon an abrasive coating incorporating particles of hardness nine or higher on Mohs' scale.

Fig. 19 also illustrates three tubular reinforcement arrays 101a, 101b, 101c imbedded in layer 100 and three similar arrays 101a', 101b', 101c' in layer 100'. The outer arrays 101a, 101c and 101a', 101c' have been shown, by way of example, to consist of steel wires alternating with glass fibers; the central arrays 101b and 101b' have been shown as composed of rubber threads. Furthermore, the reinforcements 101, 101b, 101c in layer 100 have been illustrated as helically disposed whereas the reinforcements 101a', 101b', 101c' have been shown axially oriented; it will be understood, however, that the reinforcements of the inner layer may be straight and those of the outer layer may be helical, e.g. as illustrated in Fig. 3, or that both sets of reinforcements may be straight or helically wound in the same or in opposite directions.

In Figs. 20–24 we have shown various shapes which the finished tube may assume. The tube 2000 of Fig. 20 is substantially identical with the tubes 100 previously described and illustrated, being composed of one or more cylindrical layers. The tube 2100 of Fig. 21 is composed of a series of nested layers 2101, 2102, 2103 of airfoil shape, of progressively diminishing cross section, and an innermost cylindrical layer 2104; layers 2101, 2102, 2103 may have been originally molded in the shape illustrated or may have been compressed into same from a cylindrical tube of circular or elliptical cross section. Tube 2200 of Fig. 22 is composed of two airfoil-shaped layers 2201, 2202 surrounding a core 2203, such as a steel rod, of similar cross section. Member 2300, Fig. 23, represents a board obtained by the flattening of a tube such as the tube 2000 (Fig. 20) with the aid of a hydraulic press or the like. The member 2400 of Fig. 24 is similar to member 2300 but has been pressed to a curved profile.

A further aspect of our invention involves the provision of composite or laminated structures constituted, at least in part, by one or more flattened elements of the character illustrated in Figs. 23 and 24. As shown in Fig. 25, such a composite structure 2500 may comprise a pair of boards 2300a, 2300b interleaved with a third such board 2300c transverse to the former, board 2300c being folded into S-shape to embrace the boards 2300a and 2300b. Interlockingly engaging these plastic boards and separating them from one another are sheets 2301a, 2301b, 2301c, which may be of soft iron, and a sheet 2502, e.g. of lead, which are preferably given an undulated cross section as shown. The entire assembly is encased in a shell 2503 consisting, for example, of hardened steel. Structures of this type may be used as light-weight armor plates, e.g. for military vehicles, and have shown a surprising strength and penetration resistance.

Our invention is, of course, not limited to the specific embodiments described and illustrated but may be realized, in the light of the foregoing teachings, in numerous modifications, combinations and adaptations of the features set forth without departing from the spirit and scope of the appended claims.

We claim:

1. An apparatus for producing an elongated plastic body, comprising a reservoir adapted to contain a hardenable plastic mass in a fluid state, said reservoir having a discharge opening, an annular molding chamber communicating with said discharge opening, plug means partially obstructing said discharge opening, dispenser means for so delivering to said molding chamber a plurality of flexible, elongated reinforcing elements arranged in a tubular array that, said reinforcing elements pass around said plug means through said discharge opening, wringer means yieldably urged toward said plug means and defining a narrow passage for said reinforcing elements, said passage dividing said reservoir into two compartments for successive immersions and intervening partial squeeze-drying of said reinforcing elements, and guide means for the so treated reinforcing elements forming an annular channel extending beyond said reservoir for consolidating said elements into a sheath.

2. An apparatus according to claim 1, comprising a funnel for guiding said reinforcing elements into said passage, said wringer means being a resilient extension of said funnel.

3. An apparatus according to claim 2, further comprising ball-bearing means supporting said funnel with freedom of radial movement and magnetic means tending to center said funnel with respect to said passage.

4. An apparatus according to claim 1, further comprising oscillatory means at said channel for vibrating at least part of said guide means.

5. An apparatus according to claim 4 wherein said guide means includes a cylindrical chamber, a core of magnetic material centrally positioned within said chamber, and electromagnetic means outside said chamber maintaining said core in its centered position solely by magnetic attraction, said oscillatory means including a source of pulsating current for intermittently energizing said electromagnetic means.

6. The method of producing a tubular member which comprises the steps of steeping a tubular array of non-overlapping, flexible, elongated elements in a fluid mass of a hardenable plastic material, partially drying said elements by feeding the array through a restricted annular passage adapted to squeeze excess fluid from said elements, passing said array through an annular chamber filled with another fluid mass of said material, and allowing the last-mentioned mass to harden around said elements while consolidating the latter into a tubular body.

References Cited in the file of this patent

UNITED STATES PATENTS

| | | |
|---|---|---|
| 1,261,317 | Tew | Apr. 2, 1918 |
| 2,185,570 | Ridley | Jan. 2, 1940 |
| 2,284,866 | Hansson | June 2, 1942 |
| 2,312,282 | Peet | Feb. 23, 1943 |
| 2,324,645 | Prehler | July 20, 1943 |

(Other references on following page)

UNITED STATES PATENTS

| | | | |
|---|---|---|---|
| 2,406,025 | Moor | Aug. 20, | 1946 |
| 2,451,986 | Slaughter | Oct. 19, | 1948 |
| 2,491,152 | Beidle | Dec. 13, | 1949 |
| 2,491,589 | Slaughter | Dec. 20, | 1949 |
| 2,512,844 | Weber | June 27, | 1950 |
| 2,562,523 | Brunet | July 31, | 1951 |
| 2,563,397 | Colombo | Aug. 7, | 1951 |
| 2,600,254 | Lysobey | June 10, | 1952 |
| 2,611,941 | Leitl | Sept. 30, | 1952 |
| 2,687,553 | Colombo | Aug. 31, | 1954 |
| 2,703,109 | Saville | Mar. 1, | 1955 |
| 2,747,224 | Koch et al. | May 29, | 1956 |
| 2,765,153 | Gielow et al. | Oct. 2, | 1956 |

FOREIGN PATENTS

| | | | |
|---|---|---|---|
| 370,921 | Great Britain | Apr. 8, | 1932 |
| 1,069,192 | France | Feb. 10, | 1954 |